(12) United States Patent
Jameson

(10) Patent No.: US 9,518,617 B2
(45) Date of Patent: Dec. 13, 2016

(54) INTEGRATED LEAF SPRING AND SEAL RETENTION

(71) Applicant: Schaeffler Technologies GmbH & Co. KG, Herzogenaurach (DE)

(72) Inventor: Jonathan Jameson, Dalton, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 14 days.

(21) Appl. No.: 14/274,918

(22) Filed: May 12, 2014

(65) Prior Publication Data
US 2014/0339041 A1 Nov. 20, 2014

Related U.S. Application Data

(60) Provisional application No. 61/822,945, filed on May 14, 2013.

(51) Int. Cl.
| | |
|---|---|
| *F16D 25/06* | (2006.01) |
| *F16D 13/70* | (2006.01) |
| *F16D 13/71* | (2006.01) |
| *F16D 33/18* | (2006.01) |
| *F16H 45/02* | (2006.01) |
| *F16D 25/0635* | (2006.01) |

(52) U.S. Cl.
CPC ............ *F16D 13/71* (2013.01); *F16D 13/70* (2013.01); *F16D 33/18* (2013.01); *F16D 25/0635* (2013.01); *F16D 2013/706* (2013.01); *F16H 45/02* (2013.01); *Y10T 29/49249* (2015.01)

(58) Field of Classification Search
CPC .................................................. F16D 2300/08
See application file for complete search history.

(56) References Cited

U.S. PATENT DOCUMENTS

| | | | |
|---|---|---|---|
| 6,293,380 B1 | 9/2001 | Arhab | |
| 6,640,945 B2 | 11/2003 | Arhab et al. | |
| 8,056,692 B2 | 11/2011 | George | |
| 2008/0078638 A1* | 4/2008 | Degler | F16H 45/02 192/3.3 |
| 2009/0032351 A1 | 2/2009 | Uhler | |
| 2009/0084649 A1* | 4/2009 | Kombowski et al. | 192/3.29 |
| 2011/0005880 A1* | 1/2011 | Carrier et al. | 192/3.29 |
| 2011/0290612 A1 | 12/2011 | George | |

* cited by examiner

*Primary Examiner* — Mark Manley
(74) *Attorney, Agent, or Firm* — Davidson, Davidson & Kappel, LLC

(57) ABSTRACT

A drive assembly for a drive assembly or transmission is provided. The drive assembly includes a front cover; a piston plate slidable axially toward and away from the front cover; a connection plate axially between the front cover and the piston plate elastically connecting the front cover and piston plate to each other; and at least one seal along at least one radial end of the piston plate, the connection plate and the piston plate retaining the at least one seal axially therebetween. A method of forming a drive assembly is also provided.

19 Claims, 2 Drawing Sheets

INTEGRATED LEAF SPRING AND SEAL RETENTION

This claims the benefit to U.S. Provisional Patent Application No. 61/822,945, filed on May 14, 2013, which is hereby incorporated by reference herein.

The present disclosure generally relates to a drive assembly and more specifically to a connection between a front cover and a piston plate of a drive assembly.

BACKGROUND

U.S. Publication No. 2011/0290612 discloses a clip seal with integrated clutch pack return spring.

U.S. Pat. Nos. 6,293,380 and 6,640,945 disclose flexible plates with integrated leaf springs.

U.S. Pat. No. 8,056,692 discloses a clip seal piston.

U.S. Publication No. 2009/0032351 discloses a plate arranged to seal a piston and provide a drive surface for attachment of the leaf springs.

SUMMARY OF THE INVENTION

A drive assembly for a torque converter or transmission is provided. The drive assembly includes a front cover; a piston plate slidable axially toward and away from the front cover; a connection plate axially between the front cover and the piston plate elastically connecting the front cover and piston plate to each other; and at least one seal along at least one radial end of the piston plate, the connection plate and the piston plate retaining the at least one seal axially therebetween.

Embodiments of the drive assembly may also include one or more of the following advantageous features:

The connection plate may include at least one leaf spring formed therein elastically connecting the front cover and the piston plate. At least one of the front cover and the piston plate may be riveted to the at least one leaf spring. The at least one of the front cover and the piston plate may be riveted to the at least one leaf spring by rivets extruded from the front cover. The at least one leaf spring may include a circumferentially inner hole and a circumferentially outer hole formed therein, the front cover being riveted through the circumferentially outer holes, the piston plate being riveted through the circumferentially inner hole. The connection plate and the piston plate may define at least one coined groove retaining the at least one seal axially therebetween. The at least one seal may include an inner radial seal and an outer radial seal, the at least one coined groove including a radially outer coined groove retaining the radial outer seal axially therebetween and a radially inner coined groove retaining the radial inner seal axially therebetween. The drive assembly may further include an inner radial support surface and the at least one seal may include a radial inner seal slidable along the inner radial support surface via movement of the piston plate. The drive assembly may further include an outer radial support surface, the at least one seal including a radial outer seal slidable along the outer radial support surface via movement of the piston plate. The drive assembly may further include a clutch plate, the piston plate and the connection plate being axially movable away from the front cover so the piston plate engages the clutch plate.

A method of forming a drive assembly is also provided. The method includes connecting a piston plate to a front cover with a connecting plate axially between the front cover and the piston plate such that the piston plate is slidable axially toward and away from the front cover; and retaining at least one seal axially between the connection plate and the piston plate along at least one radial end of the piston plate.

Embodiments of the method may also include one or more of the following advantageous features:

The method may further include providing a clutch plate for engagement with the piston plate, the piston plate being axially between the clutch plate and the front cover. The connection plate may include at least one leaf spring formed therein, the at least one leaf spring connecting the piston plate to the front cover. The connecting may include riveting the front cover to the at least one leaf spring with a rivet extruded from the front cover. The connecting may include riveting the piston plate to the at least one leaf spring. The retaining may include holding the at least one seal in at least one coined groove defined by at least one radial end of the piston plate and at least one radial end of the connection plate. The at least one seal may include an inner radial seal and an outer radial seal, the at least one coined groove may include a radial inner coined groove defined by radial inner ends of the piston plate and the connection plate. The at least one coined groove may include a radial outer coined groove defined by radial outer ends of the piston plate and the connection plate. The retaining may include holding the inner radial seal in the radial inner coined groove and holding the outer radial seal in the radial outer coined groove. The method may further include providing the connection plate and piston plate between an inner radial support surface and an outer radial support surface such that the inner radial seal slides axially along the inner radial support surface and the outer radial seal slides axially along the outer radial support surface as the connection plate and piston plate move axially toward and away from the front cover.

BRIEF DESCRIPTION OF THE DRAWINGS

The present invention is described below by reference to the following drawings, in which.

DETAILED DESCRIPTION

Figure 2:
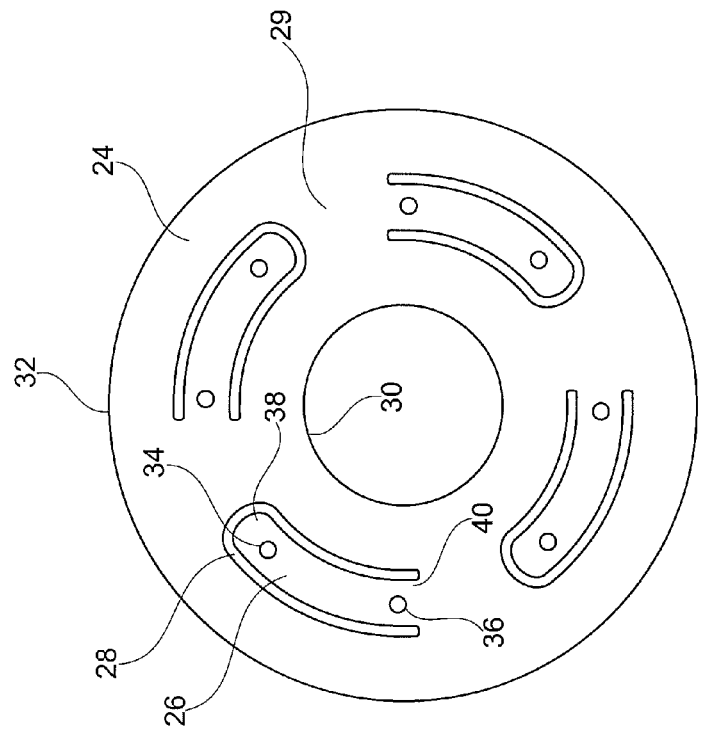
FIG. 2 shows plan view of a connection plate of the drive assembly shown in FIG. 1.
Figure 1:
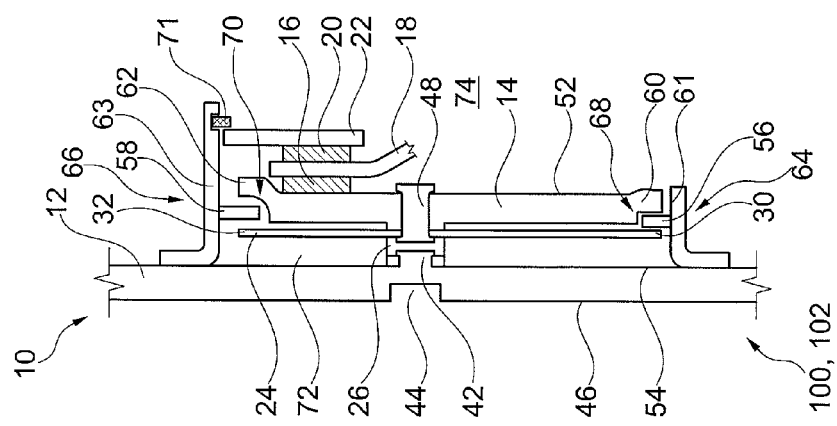
FIG. 1 shows a cross-sectional side view of a torque converter or a transmission of a motor vehicle including a drive assembly according to an embodiment of the present invention.

FIG. 1 shows a cross-sectional view of a torque converter 100 or a transmission 102 of a motor vehicle including a drive assembly 10 according to an embodiment of the present invention. Drive assembly 10 includes a front cover 12 and a piston plate 14 that is moveable axially toward and away from front cover 12 to engage a friction surface 16 on a first surface of a clutch plate 18 and press a friction surface 20 on a second surface of clutch plate 18, opposite of the first surface, against a clutch backing plate 22. A connection plate 24 is provided axially between piston plate 14 and front cover 12 to elastically connect piston plate 14 to front cover 12. Connection plate 24 includes at least one leaf spring 26 formed therein by cutting spaces 28 into an interior 29 of connecting plate 24 between a radial inner end 30 and a radial outer end 32 of connecting plate 24, as shown in FIG. 2. FIG. 2 shows a plan view of connection plate 24, which in this embodiment includes four leaf springs 26. In other embodiments, connection plate 24 may include more or less than four leaf springs 26. In this embodiment, leaf springs 26 are not stepped, but they may be stepped in other embodiments.

Leaf springs 26 extend circumferentially in connection plate 24 and each include two holes 34, 36 formed therein. First hole 34 is formed at a free end 38 of leaf spring 26 and second hole 36 is formed at a base end 40 of leaf spring 26, which connects leaf spring 26 to interior 29 of connection plate 24. In an alternative embodiment, second holes 36 may be formed in the interior 29 of connection plate 24 instead of in leaf springs 26. Free end 38 of leaf spring 26 directly connects connection plate 24 to front cover 12 and base end 40 of leaf spring 26 directly connects connection plate 24 to piston plate 14. To accomplish such connections, front cover 12 may be riveted to connection plate 24 via first hole 34 and piston plate 14 may be riveted to connection plate 24 via second hole 36.

In embodiment shown in FIG. 1, front cover 12 is riveted to connection plate 24 by extruding front cover 12 with such a force that an extruded rivet 42 is formed, installing the rivet into hole 34, and expanding the rivet to form a head. Rivet 42 fixedly connects free end 38 of leaf spring 26 and front cover 12 together. A punch may be used to extrude a portion of front cover 12, leaving an indentation 44 in an outer surface 46 of front cover 12. In this embodiment, after front cover 12 is riveted to connection plate 24, piston plate 14 is riveted to connection plate 24. In alternative embodiments, instead of extruded rivets 42, front cover 12 may be connected to connection plate 14 by conventional, cold headed rivets.

In embodiment shown in FIG. 1, piston plate 14 is riveted to connection plate 24 by a rivet 48, fixedly connecting base end 40 of leaf spring 26 and piston plate 14 together. As rivet 48 is extruded into hole 36, an inner surface 54 of front cover 12 may be used as a back stop.

Before piston plate 14 is connected to connection plate 24, an inner radial seal 56 is provided along an inner radial support surface 61 and an outer radial seal 58 is provided along an outer radial support surface 63. After piston plate 14 is connected to connection plate 24, piston plate 14 and connection plate 24 retain radial seals 56, 58. Connection plate 24 and piston plate 14 are shaped such that after piston plate 14 is connected to connection plate 24, radial inner end 30 of connecting plate 24 and a radial inner end 60 of piston plate 14 define an inner radial coined groove 64 holding inner radial seal 56 and a radial outer end 32 of connecting plate 24 and a radial outer end 62 of piston plate 14 define an outer radial coined groove 66 holding outer radial seal 58. While shown spaced apart from seals 56, 58 in FIG. 1 for clarity, one or both of radial inner ends 30, 60 may contact inner radial seal 56 to axially retain seal 56 and one or both of radial outer ends 32, 62 may contact outer radial seal 58 to axially retain seal 58. In this embodiment, half grooves 68, 70 are stamped into radial ends 60, 62 of piston plate 14 to define respective radial edges of coined grooves 64, 66. In other embodiments, connection plate 24 may be shaped to define respective radial edges of coined grooves 64, 66.

After piston plate 14 is connected to connection plate 24, clutch plate 18 may be provided adjacent to piston plate 14 and clutch backing plate 22 may be provided, such that clutch plate 18 is positioned axially between piston plate 14 and clutch backing plate 22. Clutch backing plate 22 is axially retained by a retainer 71 held in a groove in outer radial support surface 63 to axially stop clutch plate 18. The connection of piston plate 14 to connection plate 24 causes seals 56, 58 to seal a first pressure region 72 defined by front cover 12, connection plate 24 and support surfaces 61, 63 from a second pressure region 74 partially defined by surface 52 of piston plate 14. When the fluid pressure in first pressure region 72 is greater than the fluid pressure in second pressure region 74, piston plate 14 engages clutch plate 18. The engagement of clutch plate 18 by piston plate 16 allows for the transmission of torque from front cover 12 to clutch plate 18 via at least one leaf spring 26.

Figure 3:
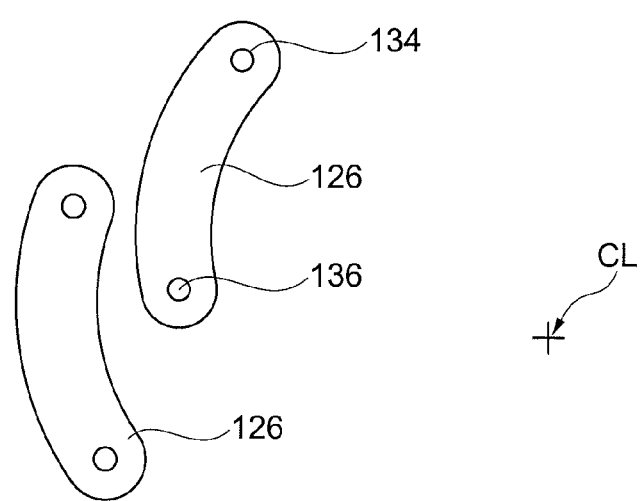
FIG. 3 shows two unattached leaf springs in a nested arrangement.

In additional embodiments, if stacked leaf springs are desired, unattached leaf springs 126 may be stamped from the inner diameter and the outer diameter of connection plate 24. That is, because connection plate 24 is a round plate, a rectangular blank from which it is formed includes scrap metal at the four quadrants between an outer diameter of the plate and an outer perimeter of the blank. Furthermore, the blank includes a scrap metal portion within an inner diameter of the connection plate. In order to conserve material, leaf springs 126 may be formed in these scrap portions. Leaf springs 126 may be oriented in the scrap metal portion end to end, or in a nested arrangement, which is shown in FIG. 3. Otherwise stated, durability of the plate connection may be improved by stacking leaf spring 126 on top of leaf spring 26 during assembly such that hole 134 is aligned with hole 34 and hole 136 is aligned with hole 36 and riveting the springs together so that torque load transferred between cover 12 and piston plate 14 by plate 24 is shared evenly by each spring. Alternatively, hole 136 in leaf spring 126 may be fixed to hole 34 in leaf spring 24 (i.e., by riveting) and hole 134 in leaf spring 126 may be fixed to cover rivet 42, extending a circumferential length of the leaf spring and reducing an axial force acting on piston plate 14.

In the preceding specification, the invention has been described with reference to specific exemplary embodiments and examples thereof It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A drive assembly for a torque converter or transmission comprising:
    a front cover;
    a piston plate slidable axially toward and away from the front cover;
    a connection plate axially between the front cover and the piston plate elastically connecting the front cover and piston plate to each other, the connection plate being a single piece directly connected to the front cover by first fasteners and directly connected to the piston by second fasteners; and
    at least one seal along at least one radial end of the piston plate, the connection plate and the piston plate retaining the at least one seal axially therebetween,
    the connection plate including at least one leaf spring formed therein elastically connecting the front cover and the piston plate,
    at least one of the front cover and the piston plate being riveted to the at least one leaf spring, the at least one leaf spring including a free end and a base end, the free end and the base end being defined by spaces in an interior of the connection plate between an inner circumference and an outer circumference of the connection plate, the leaf spring including a radially outer edge extending circumferentially from the free end to the base end, the radially outer edge being radially offset from and radially inside of the outer circumference of the connecting plate.

2. The drive assembly as recited in claim 1 wherein the at least one of the front cover and the piston plate riveted to the at least one leaf spring by rivets extruded from the front cover.

3. The drive assembly as recited in claim 1 wherein the at least one leaf spring includes a circumferentially inner hole and a circumferentially outer hole formed therein, the front cover being riveted through the circumferentially outer holes, the piston plate being riveted through the circumferentially inner hole.

4. The drive assembly as recited in claim 1 wherein the connection plate and the piston plate define at least one coined groove retaining the at least one seal axially therebetween.

5. The drive assembly as recited in claim 4 wherein the at least one seal includes an inner radial seal and an outer radial seal, the at least one coined groove including a radially outer coined groove retaining the radial outer seal axially therebetween and a radially inner coined groove retaining the radial inner seal axially therebetween.

6. The drive assembly as recited in claim 1 further comprising an inner radial support surface, the at least one seal including a radial inner seal slidable along the inner radial support surface via movement of the piston plate.

7. The drive assembly as recited in claim 1 further comprising an outer radial support surface, an axially slidable clutch plate and a clutch backing plate axially held at the outer radial support surface configured for limiting axial movement of the clutch plate, the at least one seal including a radial outer seal slidable along the outer radial support surface via movement of the piston plate, the piston plate and the connection plate being axially movable away from the front cover so the piston plate forces the clutch plate against the clutch backing plate.

8. A torque converter comprising the drive assembly recited in claim 1.

9. A transmission comprising the drive assembly recited in claim 1.

10. A method of forming a drive assembly for a converter or transmission comprising: connecting a piston plate to a front cover through a connecting plate axially between the front cover and the piston plate such that the piston plate is slidable axially toward and away from the front cover, the connection plate being a single piece directly connected to the front cover by first fasteners and directly connected to the piston by second fasteners; and retaining at least one seal axially between the connection plate and the piston plate along at least one radial end of the piston plate, at least one of the front cover and the piston plate being riveted to at least one leaf spring, the at least one leaf spring including a free end and a base end, the free end and the base end being defined by spaces in an interior of the connection plate between an inner circumference and an outer circumference of the connection plate, the leaf spring including a radially outer edge extending circumferentially from the free end to the base end, the radially outer edge being radially offset from and radially inside of the outer circumference of the connecting plate.

11. The method as recited in claim 10 wherein the connecting includes riveting the front cover to the at least one leaf spring with a rivet extruded from the front cover.

12. The method as recited in claim 10 wherein the connecting includes riveting the piston plate to the at least one leaf spring.

13. The method as recited in claim 10 wherein the retaining includes holding the at least one seal in at least one coined groove defined by at least one radial end of the piston plate and at least one radial end of the connection plate.

14. The method as recited in claim 13 wherein the at least one seal includes an inner radial seal and an outer radial seal, the at least one coined groove including a radial inner coined groove defined by radial inner ends of the piston plate and the connection plate, the at least one coined groove including a radial outer coined groove defined by radial outer ends of the piston plate and the connection plate, the retaining including holding the inner radial seal in the radial inner coined groove and holding the outer radial seal in the radial outer coined groove.

15. The method as recited in claim 14 further comprising providing the connection plate and piston plate between an inner radial support surface and an outer radial support surface such that the inner radial seal slides axially along the inner radial support surface and the outer radial seal slides axially along the outer radial support surface as the connection plate and piston plate move axially toward and away from the front cover.

16. The method as recited in claim 10 further comprising providing a clutch plate for engagement with the piston plate, the piston plate being axially between the clutch plate and the front cover.

17. The drive assembly as recited in claim 7 further comprising a retainer held in a groove in the outer radial support surface axially retaining the clutch backing plate.

18. A drive assembly for a torque converter or transmission comprising:
   a front cover;
   a piston plate slidable axially toward and away from the front cover;
   a connection plate axially between the front cover and the piston plate elastically connecting the front cover and piston plate to each other, the connection plate being a single piece directly connected to the front cover by first fasteners and directly connected to the piston by second fasteners;
   at least one seal along at least one radial end of the piston plate, the connection plate and the piston plate retaining the at least one seal axially therebetween;
   an outer radial support surface;
   an axially slidable clutch plate; and
   a clutch backing plate axially held at the outer radial support surface configured for limiting axial movement of the clutch plate, the at least one seal including a radial outer seal slidable along the outer radial support surface via movement of the piston plate, the piston plate and the connection plate being axially movable away from the front cover so the piston plate forces the clutch plate against the clutch backing plate.

19. The drive assembly as recited in claim 18 further comprising a retainer held in a groove in the outer radial support surface axially retaining the clutch backing plate.

* * * * *